United States Patent [19]

Arakawa et al.

[11] Patent Number: 4,487,021
[45] Date of Patent: Dec. 11, 1984

[54] RESERVOIR HAVING A LEVEL DETECTOR

[75] Inventors: Susumu Arakawa, Chiryu; Tooru Tsukigahora, Toyota; AKira Shirai, Toyoake, all of Japan

[73] Assignees: Aisin Seiki Kabushikikaisha, Kariya; Toyota Jidoshakogyo, Toyota, both of Japan

[21] Appl. No.: 391,838

[22] Filed: Jun. 24, 1982

[30] Foreign Application Priority Data

Jun. 26, 1981 [JP] Japan .............................. 56-093880

[51] Int. Cl.³ ...................... F16K 24/00; H01H 35/18; B60T 11/26
[52] U.S. Cl. ........................................ 60/534; 60/584; 60/592; 340/52 C; 116/227; 200/84 B; 200/84 C
[58] Field of Search .................. 60/534, 535, 585, 592; 340/52 C; 116/227; 367/908; 200/84 R, 84 C, 84 B

[56] References Cited

U.S. PATENT DOCUMENTS

| | | | |
|---|---|---|---|
| 3,208,281 | 9/1965 | Kalmus et al. | 367/908 |
| 3,678,232 | 7/1972 | Hodges | 200/84 C |
| 3,680,044 | 7/1972 | Tsubouchi | 200/84 |
| 4,046,977 | 9/1977 | Cadeddu | 200/84 C |
| 4,057,700 | 11/1977 | Nakashima | 200/84 C |
| 4,136,712 | 1/1979 | Nogami et al. | 60/535 |
| 4,356,729 | 11/1982 | Kubota et al. | 200/84 C |

FOREIGN PATENT DOCUMENTS

| | | | |
|---|---|---|---|
| 54-156975 | 11/1979 | Japan | 60/592 |
| 55-112401 | 8/1980 | Japan | 60/585 |

Primary Examiner—Robert E. Garrett
Assistant Examiner—Scott L. Moritz
Attorney, Agent, or Firm—Burns, Doane, Swecker & Mathis

[57] ABSTRACT

A hydraulic fluid reservoir for automobile including a partition wall within a reservoir casing defining a float chamber and extending from the bottom of the reservoir casing, a float which is movable in said float chamber so as to cause a switch to close or open at a predetermined float level, a communication opening communicating the float chamber with the outside chamber of the partition wall at the lower portion thereof and a fluid reflection cover disposed on the float chamber, malfunction of the level detector is avoided.

1 Claim, 3 Drawing Figures

RESERVOIR HAVING A LEVEL DETECTOR

BACKGROUND OF THE INVENTION

The present invention relates to a hydraulic fluid reservoir having a level detector, in particular, to a fluid level reservoir in which malfunction of a fluid level alarm due to vibrations, inclination, acceleration and or deceleration of a vehicle is prevented.

The level of hydraulic fluid within a reservoir of a vehicle is varied by vibrations and/or acceleration of the vehicle independently of the quantity of the fluid in the reservoir resulting in malfunction of the fluid level alarm. In order to avoid such malfunction there has been provided a partition which surrounds a float as shown in FIG. 1. However merely providing such a partition is not effective for a flat type reservoir which has recently popularly been adopted since such a partition may not suppresses the variation in the fluid level due to vibrations and/or acceleration of the vehicle.

SUMMARY OF THE DISCLOSURE

It is therefore an object of the present invention to provide a novel hydraulic fluid reservoir.

It is another object of the present invention to provide a hydraulic fluid reservoir in which the influences of vibrations and/or acceleration of the vehicle upon the fluid level within the reservoir is reduced so that the malfunction of the fluid level detector is prevented.

Other objects of the present invention will become apparent in the entire disclosure, claims and drawings.

In accordance with the present invention there is provided a hydraulic fluid reservoir including a reservoir casing, a partition wall within the reservoir casing defining a float chamber and extending from the bottom of the reservoir casing, a float which is movable upwards and downwards in said float chamber so as to cause a switch to close or open at a predetermined float level, and a communication opening communicating the float chamber with an outside chamber of the partition wall at the lower portion thereof; wherein the improvement comprises a fluid reflection cover which is disposed on the float chamber provided that air is allowed to restrictively flow between said float chamber and the outside chamber.

According to such a construction, the malfunction of the fluid level detector due to vibrations, inclination, acceleration and/or deceleration of the vehicle can be avoided. Even if the fluid level in the outside chamber is varied due to acceleration of the vehicle, the fluid level in the float chamber is maintained stable. On the other hand, even if the fluid in the outside chamber splashes on the reflection cover due to vibration of the vehicle, the splashed fluid is prevented from flowing into the float chamber. The same is applied when the fluid in the outside chamber overflows over the partition wall due to sudden deceleration of the vehicle.

Air is allowed to restrictively flow between the float chamber and the outside chamber in order to maintain the fluid level of the float chamber in accordance with the normal level of the outside chamber. Such air flow is permitted through a gap between the fluid reflection cover and the partition wall or a through hole or holes provided in the fluid reflection cover.

A rod like switch casing having a switch or float-level sensing means therein extends upwards from the reservoir casing bottom within the float chamber, the switch casing being surrounded by the float for guiding the float. The fluid reflection cover is mounted on the upper end of the switch casing bifunctionally acting as an upper limit stopper of the float. Alternatively, the fluid reflection cover is mounted on the upper end of the partition wall, wherein the upper limit stopper is preferably provided at the upper end of the switch casing.

The switch mostly used is a reed switch actuatable by means of a magnet mounted on or in the float. However other known switches actuatable due to the level variation of the float or the magnet on the float may be employed, such switches encompassing mechanically actuatable switches or other electric or electronic switches operated in conjunction with float level-sensing means.

In the following, preferred embodiments of the invention will be illustrated by accompanying drawings which are presented for better illustration and not for limitation of the present invention.

DETAILED DESCRIPTION OF THE PREFERRED EMBODIMENTS

Figure 1:
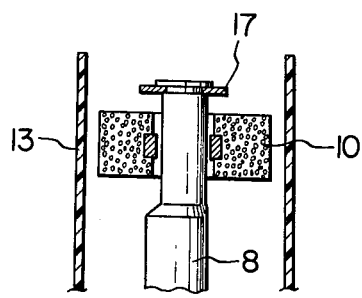
FIG. 1 is a partial, sectional view showing a level detector of a conventional fluid reservoir.
Figure 2:
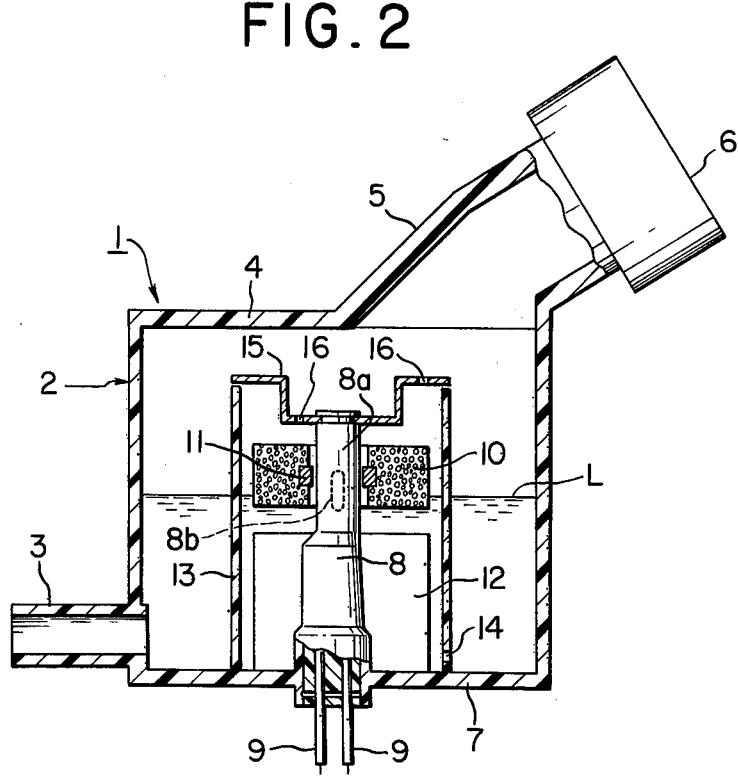
FIG. 2 is an elevational view partly in section showing a reservoir embodiment of the present invention.

An embodiment of a reservoir having a level detector of the present invention will be described with reference to the drawings. Referring now to FIG. 2, a body, i.e., reservoir casing 2 of the reservoir 1 is a vessel having a conventional structure. An outlet 3 is provided in the side wall of the reservoir casing 2 in the vicinity of the bottom 7 of the reservoir casing 2 for supplying a brake cylinder or clutch etc. (not shown) with hydraulic fluid. A filler neck or inlet 5 is provided at the uppermost portion (or top wall) 4 of the reservoir casing 2 for introducing fluid into the reservoir 1. An end cap 6 is removably provided on the end of the filler neck 5 to prevent the leakage of the fluid in the reservoir 2 while the vehicle is running.

A switch casing 8 in the form of a rod having a reed switch therein extends upwards from the bottom 7 of the reservoir casing 2. The switch casing 8 is made of a nonmagnetic material, e.g., plastics or nonmagnetic metal. A reed switch 8b is disposed within the switch casing 8 and is connected with an alarm device (not shown) such as lamp or buzzer through conductors 9.

An annular float 10 surrounds a diameter-reduced portion 8a of the switch casing 8. The float 10 moves upwards and downwards depending upon the gradual, ordinary change in the fluid level L within the reservoir 1. A magnet 11 is retained at the inner periphery of the float 10. The float 10 moves downwards when the fluid level L is lowered. The reed switch is caused to close or open when the float reaches a given level detecting the lowering of the fluid level L. The lower limit of the movable range of the float 10 is restricted by a stopper 12.

A cylindrical partition wall 13 is secured to the bottom 7 of the reservoir casing 2. The parition wall 13 projects upwards from the bottom 7 of the reservoir casing 2 so that the partition wall 13 surrounds the float 10. An opening 14 in the form of a through hole, slit or the like is formed in the lower portion of the partition wall 13.

The spaces in the inside (float chamber) and outside (outside chamber) of the partition wall 13 are communicated each other by the opening 14. The partition wall 13 is adapted to keep the fluid level L in the float chamber stable against vibrations, inclination, sudden acceleration, and/or deceleration of the vehicle whereas the fluid level L in the float chamber descends or ascends generally depending upon the quantity of the fluid in the reservoir through the opening 14. A fluid reflection cover 15 is fitted to a groove provided on the upper end of the switch casing 8 so that the cover 15 covers the upper opening of the partition wall 13. The cover 15 also acts as an upper limit stopper for the float 10. The cover 15 may be in close contact with or slightly separated from the upper end of the partition wall 13. An air discharging hole 16 is provided at the cover 15 to facilitates the communication of the air between the inside and outside of the partition wall 13 necessary for changes in the fluid level L in the float chamber. The air discharging hole 16 may be replaced with a notch between the cover 15 and the partition wall 13.

The changes in the fluid level L within the partition wall 13 due to vibrations and/or acceleration of the vehicle is reduced since the float 10 is surrounded by the partition wall 13 and the fluid reflection cover 15. Accordingly, malfunction of the level detector and fluid level alarm is prevented. In particular this is significant for the reservoir of the flat type.

Figure 3:
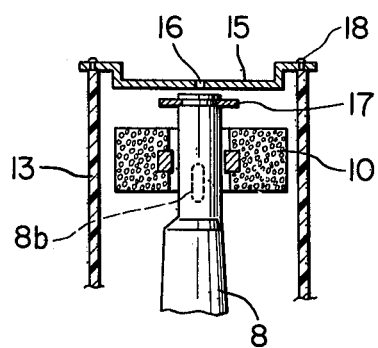
FIG. 3 is a partial, sectional view showing another embodiment of the present invention.

An alternative embodiment of the present invention is shown in FIG. 3 which is substantially identical with that as shown in FIG. 2 except for that the fluid reflection cover 15 is provided separately from the upper stopper 17. In this case the fluid reflection cover 15 is secured to the upper end of the partition wall 13 by means of screw 18 or the like.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A hydraulic fluid reservoir including:
   a reservoir casing defining an internal area adapted to contain a liquid,
   a partition wall formed integrally with the reservoir casing and defining a float chamber interiorly of the reservoir casing and substantially separated from the internal area of the reservoir casing and extending upward from a bottom section of the reservoir casing to form an upper opening of the float chamber,
   a rod-like switch casing having a switch or float level sensing means therein and formed integrally with the reservoir casing and extending upwardly from the bottom of the reservoir within the float chamber,
   a float disposed in said float chamber and movable upwards and downwards between a lower position and an upper position in response to variations of levels of the liquid so as to cause the switch to close or open at a predetermined float level,
   a communication opening communicating the float chamber with said internal area at a lower portion of the partition wall,
   a fluid reaction cover plate mounted on the upper end of the switch casing and disposed over the float chamber to cover the upper opening thereof and to provide a gap between the fluid reaction cover plate and the partition wall, the fluid reaction cover plate having through holes therein, and
   a stopper plate integral with the switch casing and the reservoir casing, the switch casing extending upward from the bottom of the float chamber and defining the lowest position of the float, the fluid reflection cover plate bifunctionally defining an upper limit stop for the float and preventing substantial variation of the liquid level within the float chamber.

* * * * *